United States Patent [19]

Fujinami

[11] Patent Number: 5,502,573
[45] Date of Patent: Mar. 26, 1996

[54] APPARATUS FOR REPRODUCING AND DECODING MULTIPLEXED DATA FROM A RECORD MEDIUM WITH MEANS FOR CONTROLLING DATA DECODING AS A FUNCTION OF SYNCHRONIZATION ERRORS

[75] Inventor: Yasushi Fujinami, Kanagawa, Japan

[73] Assignee: Sony Corporation, Tokyo, Japan

[21] Appl. No.: 165,885

[22] Filed: Dec. 14, 1993

[30] Foreign Application Priority Data

Dec. 18, 1992 [JP] Japan ................................. 4-355557
Jan. 29, 1993 [JP] Japan ................................. 5-034557

[51] Int. Cl.$^6$ .............................. H04N 5/95; H04N 5/78
[52] U.S. Cl. .............................................. 358/339; 360/33.1
[58] Field of Search ................................. 358/335, 310, 358/341, 342, 343, 339, 337, 320; 360/33.1; 369/48; H04N 5/76, 9/79, 5/92, 5/91, 5/78, 5/95, 4/89

[56] References Cited

U.S. PATENT DOCUMENTS

| 3,898,376 | 8/1975 | Nabeyama et al. |  |
|---|---|---|---|
| 5,218,450 | 6/1993 | Nagai et al. | 358/335 |
| 5,226,026 | 7/1993 | Oshiba | 369/48 |
| 5,233,589 | 8/1993 | Saito et al. | 369/48 |
| 5,291,486 | 3/1994 | Koyanagi | 370/84 |

FOREIGN PATENT DOCUMENTS 0245904 11/1987 European Pat. Off. .
0460751 12/1991 European Pat. Off. .

OTHER PUBLICATIONS

Signal Processing Image Communication, vol. 4, No. 2, May 1992, Amsterdam (NL) pp. 153–159 Alexande G. Macinnis 'The MPEG systems coding specification'.
Patent Abstracts of Japan, vol. 9, No. 259 (P–397) 17 Oct. 1985, JP-A-60 107 760 (Nippon Denki K.K.) 13 Jun. 1985.

*Primary Examiner*—Thai Q. Tran
*Attorney, Agent, or Firm*—William S. Frommer

[57] ABSTRACT

Apparatus for reproducing video data from a record medium on which is recorded, in multiplexed form, video data, reference time data representing a reference time, and video time data representing the time at which decoding of the video data reproduced from the record medium should begin. The reference time data is separated from the reproduced multiplexed data and used to generate timing data. The video data and video time data are temporarily stored in a video buffer and a video time data extractor is connected to the output of the video buffer to extract the video time data from the contents of the video buffer. The video buffer also is connected to a video decoder which decodes the video data temporarily stored in the video buffer, the operation of the video decoder being controlled as a function of a comparison between the generated timing data and the extracted video time data.

17 Claims, 13 Drawing Sheets

FIG. 1(B)
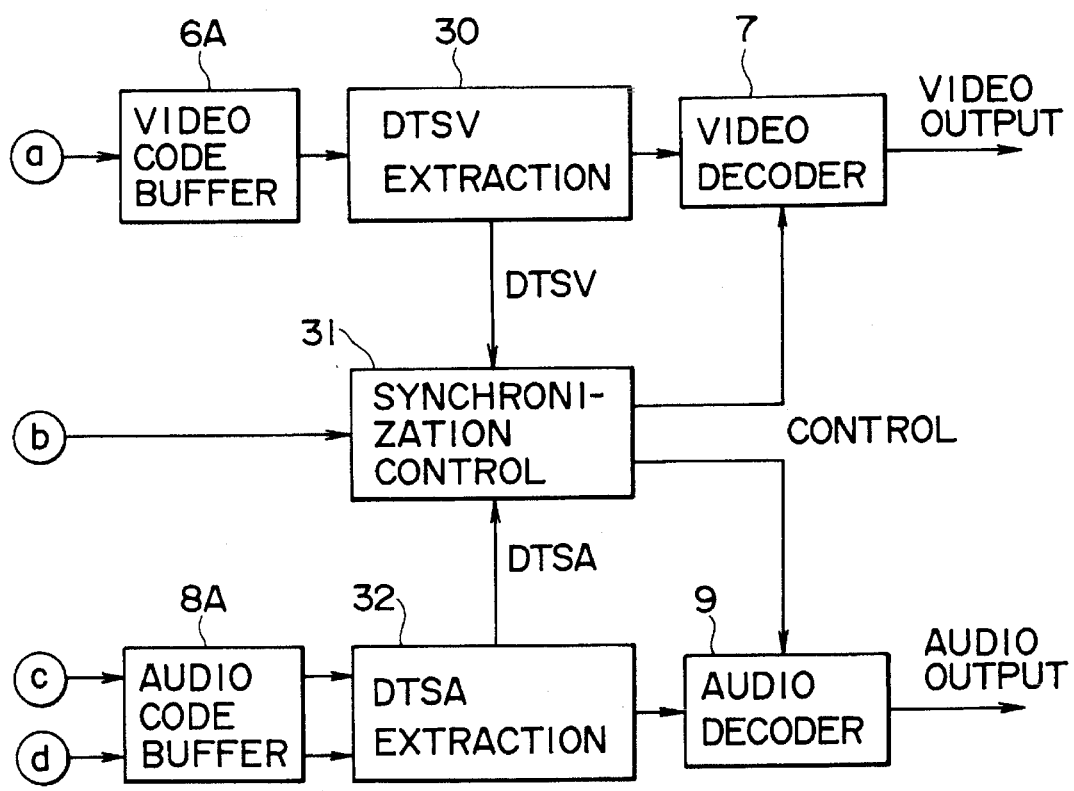
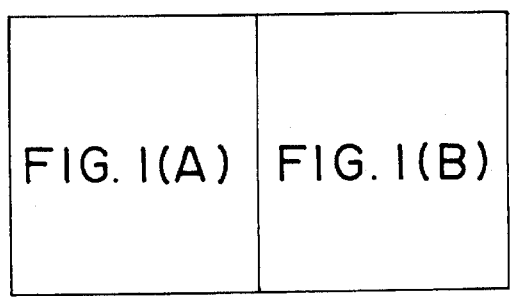

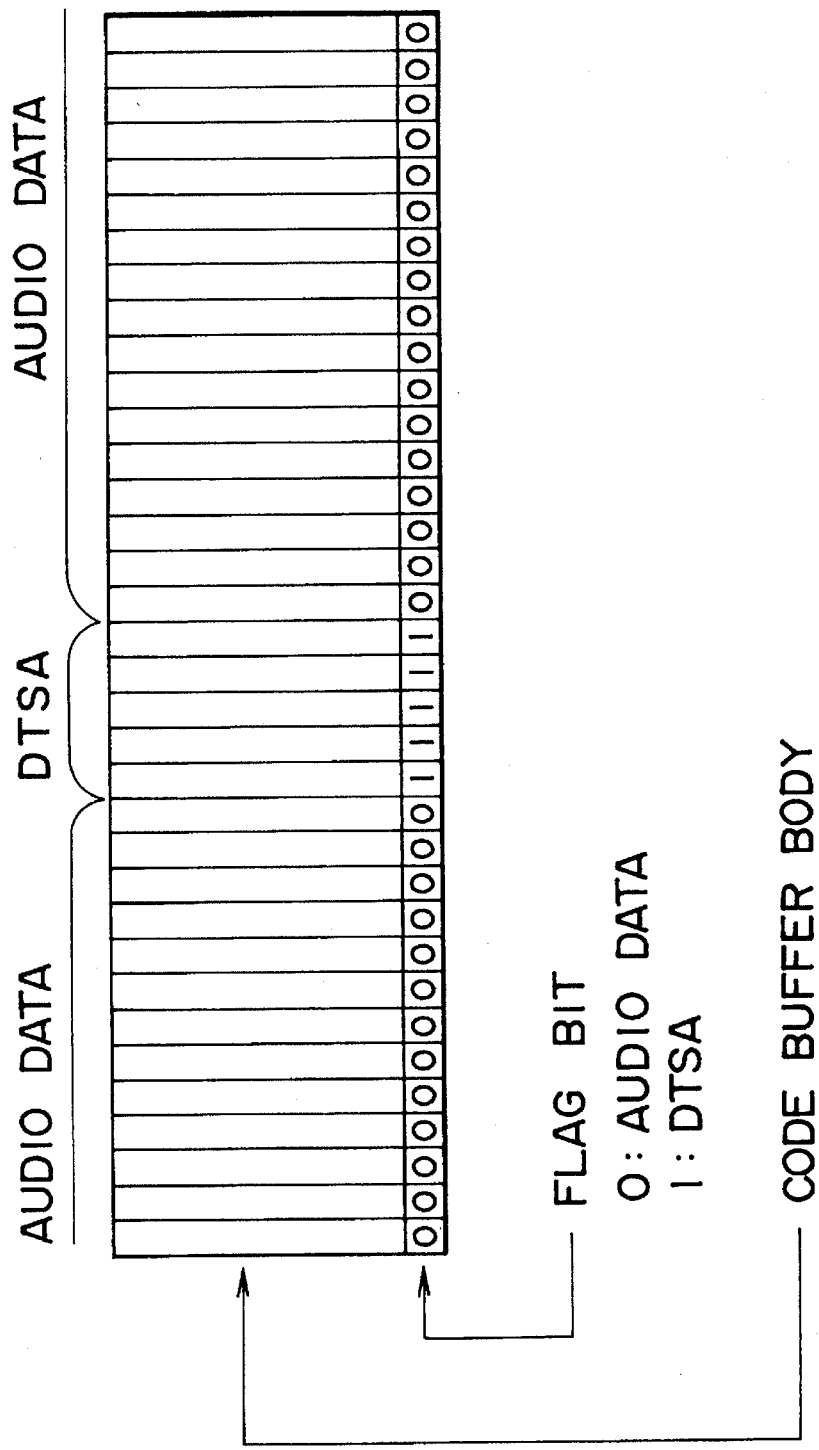

FIG. 3(a)  VIDEO BIT STREAM (DECODER INPUT, DECODING)
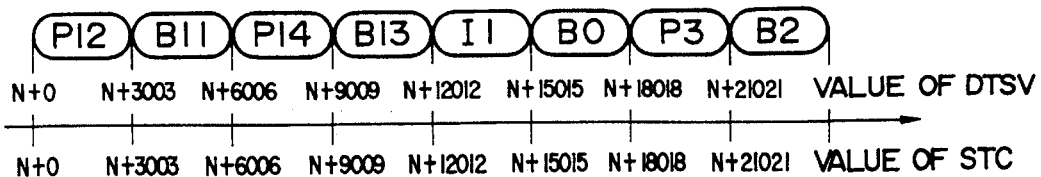
FIG. 3(b)  DECODER OUTPUT, DISPLAY
FIG. 3(c)  VIDEO BIT STREAM (ERROR OCCURRENCE)
FIG. 3(d)  ERROR BIT STREAM INPUT
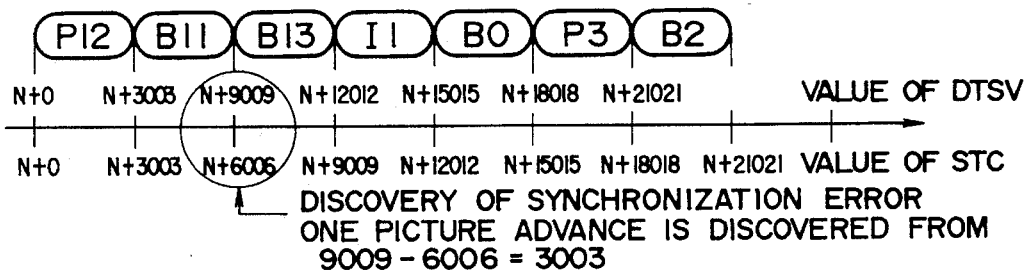
FIG. 3(e)  ERROR BIT STREAM PROCESSING
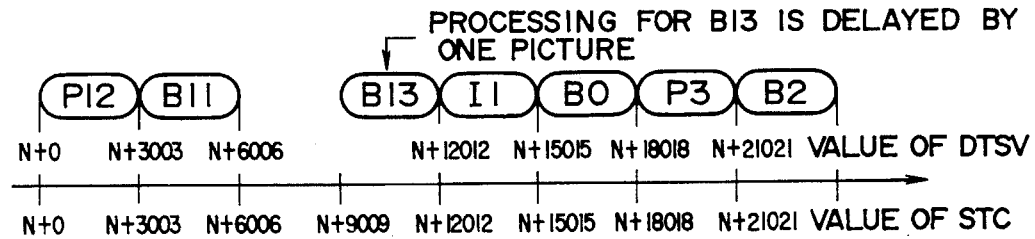
FIG. 3(f)  DECODER OUTPUT, AFTER SYNCHRONIZATION ERROR CORRECTION

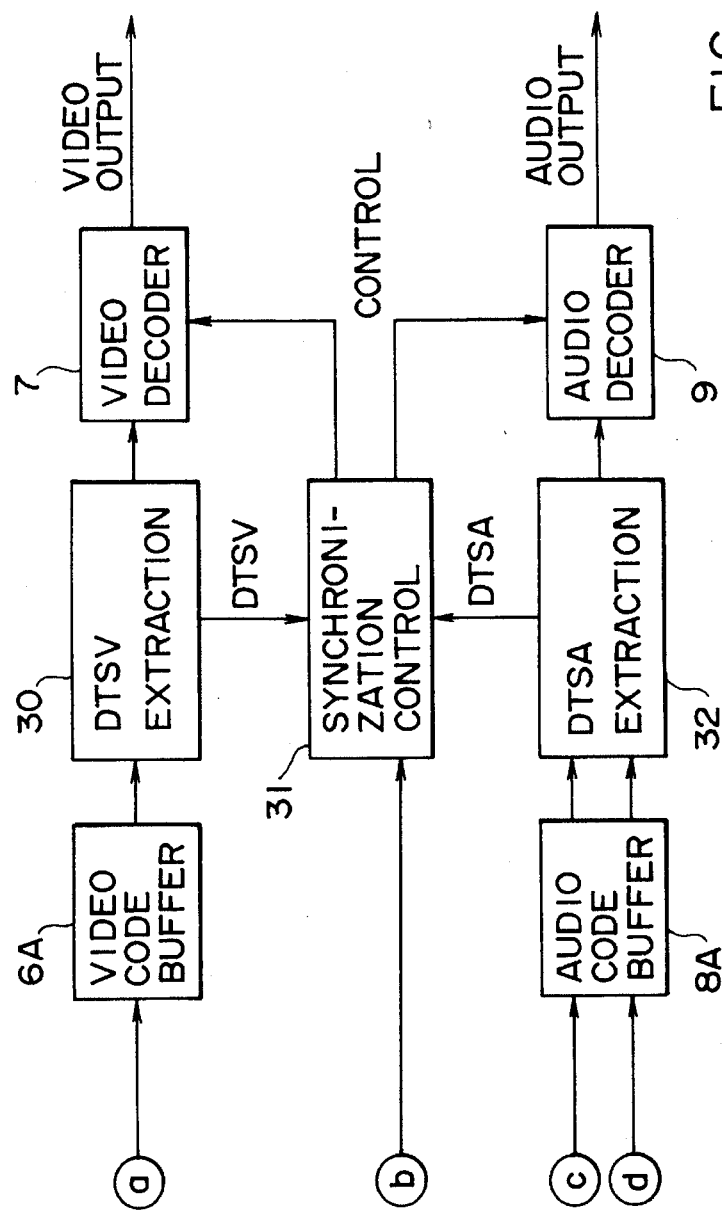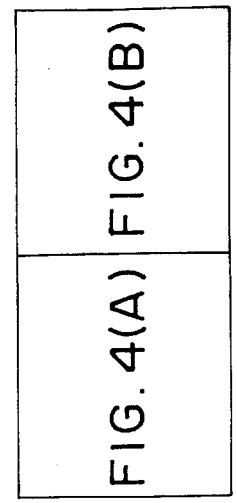

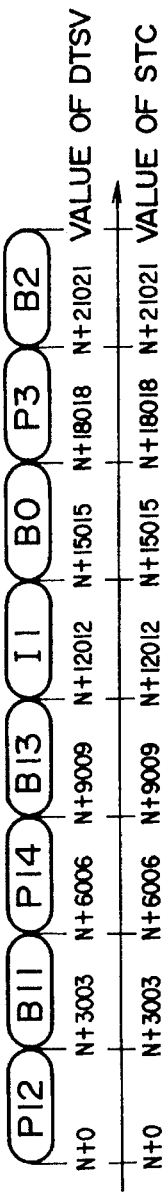
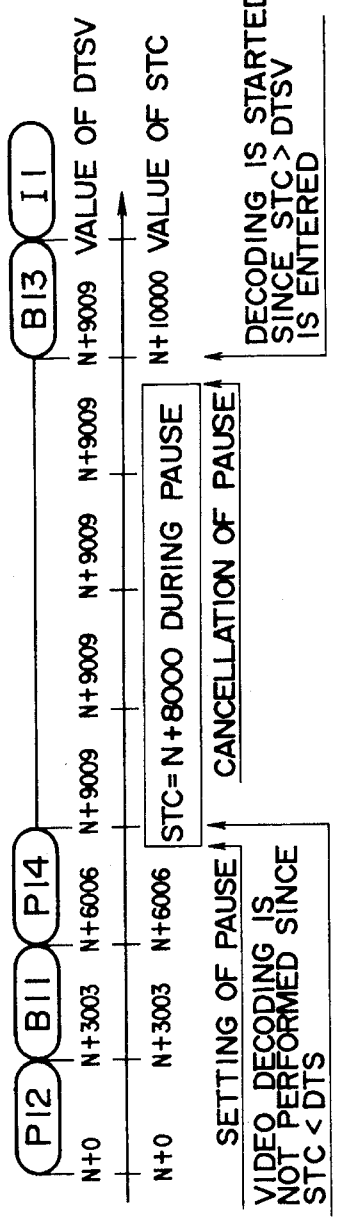
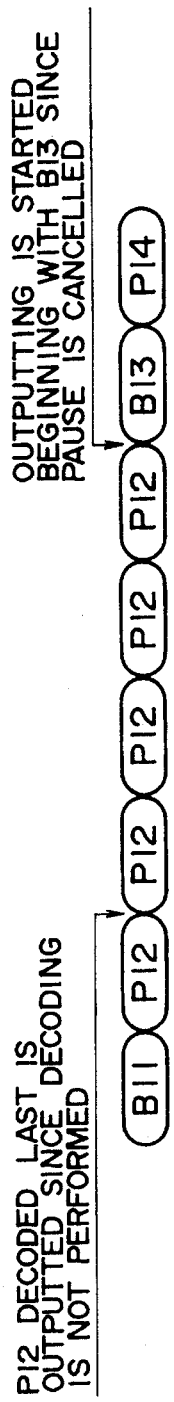
FIG. 5(a) VIDEO BIT STREAM, DECODER INPUT, DECODING
FIG. 5(b) DECODER OUTPUT, DISPLAY
FIG. 5(c) PAUSE
FIG. 5(d) DECODER OUTPUT, DISPLAY FIG. 9(a) VIDEO BIT STREAM (DECODER INPUT, DECODING)
FIG. 9(b) DECODER OUTPUT, DISPLAY
FIG. 9(c) VIDEO BIT STREAM (ERROR OCCURRENCE)
FIG. 9(d) ERROR BIT STREAM PROCESSING
FIG. 9(e) DECODER OUTPUT OCCURRENCE OF SYNCHRONIZATION ERROR
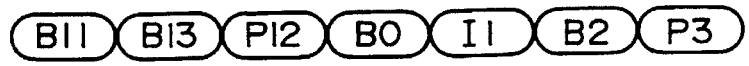
ENTIRE BIT STREAM IS ADVANCED BY ONE PICTURE AS A RESULT OF LOSS OF P14

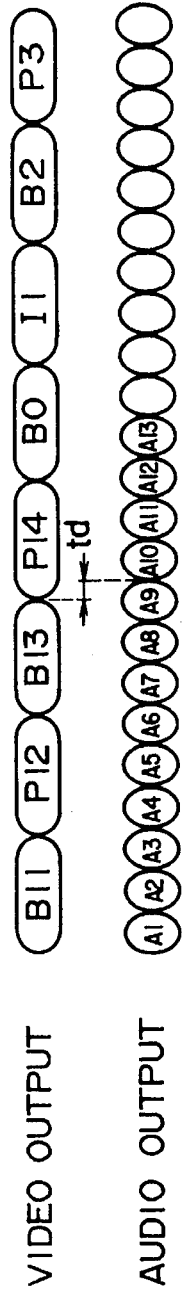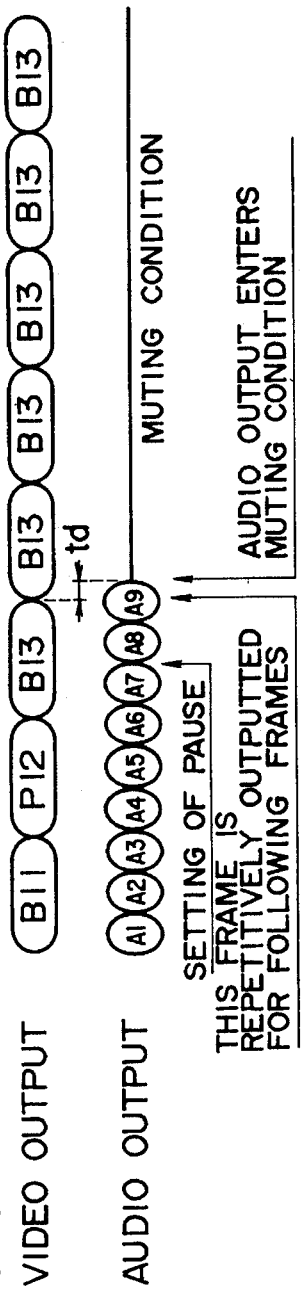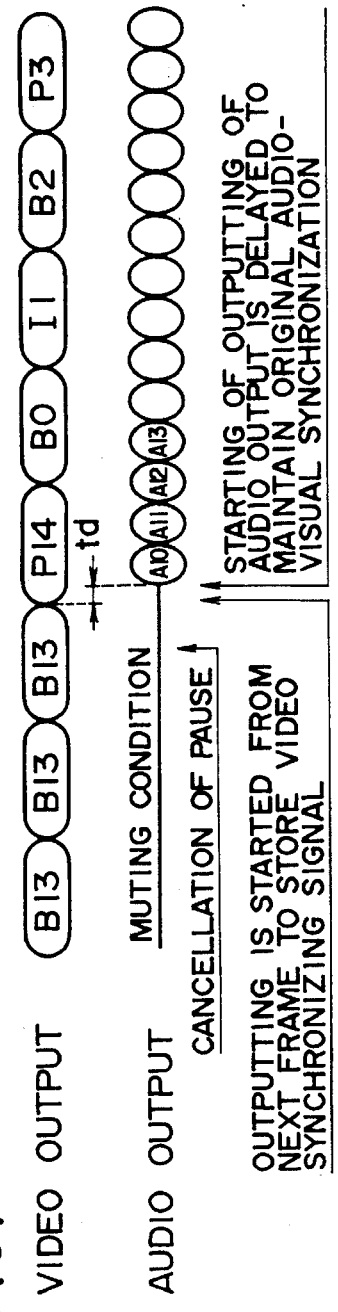

APPARATUS FOR REPRODUCING AND DECODING MULTIPLEXED DATA FROM A RECORD MEDIUM WITH MEANS FOR CONTROLLING DATA DECODING AS A FUNCTION OF SYNCHRONIZATION ERRORS

RELATED APPLICATIONS

U.S. patent application Ser. No. 07/925,736, filed Aug. 7, 1992 now U.S. Pat. No. 5,291,486.

BACKGROUND OF THE INVENTION

This invention relates to apparatus for reproducing multiplexed data from a record medium, such as time division multiplexed video and audio data recorded on an optical disk, and more particularly, to such apparatus which senses synchronization errors and controls video and audio decoding as a function of those errors.

It has been proposed to record digital video and audio data in a time division multiplexed format in successive tracks on a record medium, such as successive circular tracks on an optical disk. The multiplexed data is arranged in a pack, such as in accordance with a suggested standard (ISO1172) of the Motion Pictures Experts Group (MPEG), and as schematically illustrated in FIG. 7, one or more packs are recorded in a track. A pack is comprised of a pack header followed by a video packet and an audio packet. The pack header includes a PACK START CODE which, preferably, is in the form of a unique bit pattern which identifies the beginning of the pack header. A system clock reference SCR follows the PACK START CODE and represents a time code corresponding to the time at which the pack was recorded. The time code may represent real time (hours, minutes, seconds, etc.) or may be a multi-bit number derived from a system clock that was turned on when the information on the record medium was recorded. For example, the time at which the last byte in the preceding pack was recorded on the record medium may be represented by system clock reference SCR.

The pack header also includes MUX RATE data representing a transfer rate, that is, the rate at which video and audio data included in the video and audio packets, respectively, are time division multiplexed.

The video packet includes a packet header followed by encoded digital video data. The video packet header is comprised of a VIDEO PACKET START CODE whose function is similar to that of the aforementioned PACK START CODE, namely to identify the beginning of the video packet. It is appreciated that the VIDEO PACKET START CODE thus is formed of a unique bit pattern that may be easily recognized. Following the VIDEO PACKET START CODE is a video decoding time stamp (DTSV) which is a multi-bit number that identifies the time at which a video decoder initiates its operation to decode the video data. As will be described below, in a proposed reproducing device, the video and audio data are demultiplexed from the pack illustrated in FIG. 7, and supplied to respective video and audio decoders. It is important that each decoder be supplied with a START signal that coincides with the beginning of the video and audio data, respectively, thereby assuring that the video decoder properly decodes the video data and that the audio decoder properly decodes the audio data. The video decoding time stamp DTSV is referenced to the system clock reference SCR, the latter being used to preset a clock which, when incremented to a value equal to the video decoding time stamp DTSV, essentially turns on the video decoder.

The audio packet is similar to the video packet and includes encoded digital audio data which is preceded by a packet header. Like the video packet header, the audio packet header includes an AUDIO PACKET START CODE which, when detected, identifies the beginning of the audio packet, followed by an audio decoding time stamp DTSA which represents the time at which the audio decoder is to be turned on to decode the audio data. Like the video decoding time stamp DTSV, the audio decoding time stamp DTSA is referenced to the system clock reference SCR.

One example of apparatus which has been proposed to reproduce the multiplexed video and audio data exhibiting the format shown in FIG. 7 is illustrated in FIGS. 6A and 6B. Assuming that the multiplexed data is recorded on an optical disk, the reproducing apparatus is comprised of a disk drive 1, a demodulator 2, an error correcting code (ECC) circuit 3, a ring buffer 4, a demultiplexer 5 and, as shown in FIG. 6B, separate video and audio decoding channels, each being comprised of a buffer and a decoder. Disk drive 1 is conventional and includes a pickup head which reproduces the data packs having the format shown in FIG. 7 and supplies same to demodulator 2 which demodulates the multiplexed data therefrom. This demodulated digital data is supplied to ECC circuit 3 which, as is conventional, detects the presence of errors and, based upon known algorithms, corrects those errors provided, of course, that such errors are not so pervasive as to be uncorrectable. The error corrected digital data then is supplied to ring buffer 4 which stores such data until a predetermined amount is accumulated, whereupon the buffer supplies the stored data to demultiplexer 5. The ring buffer thus provides a buffering action to the operation of the ECC circuit, which may be variable, thereby supplying a substantially steady stream of data to demultiplexer 5.

The demultiplexer includes a data separator 21, a video decoding time stamp register 22, an audio decoding time stamp register 24, a clock register 26 and comparators 23 and 25. Data separator 21 acts to separate the encoded video data, the encoded audio data, the system clock reference SCR, the video decoding time stamp DTSV and the audio decoding time stamp DTSA from the multiplexed bit stream supplied thereto by ring buffer 4. The separated video data is supplied to and temporarily stored in video buffer 6 and, similarly, the separated audio data is supplied to and temporarily stored in audio buffer 8.

Clock register 26 is preset by the separated system clock reference SCR and is coupled to a clock generator 27 which, in accordance with the MPEG standard, generates a 90 KHz clock signal. Clock register 26 thus is incremented from its preset count by each clock signal generated by clock generator 27, thereby producing timing data referred to as system time clock values STC. The system time clock STC is coupled in common to comparators 23 and 25. Video decoding time stamp register 22 receives and stores the separated video decoding time stamp DTSV and supplies this video decoding time stamp to comparator 23. When the system time clock STC is incremented to a count equal to the video decoding time stamp DTSV (STC=DTSV), comparator 23 generates a video decoding start signal. Similarly, audio decoding time stamp register 24 receives and stores the separated audio decoding time stamp DTSA. This stored audio decoding time stamp is supplied to comparator 25; and when the system time clock STC is incremented to a count that is equal to the audio decoding time stamp DTSA (STC=DTSA), comparator 25 generates an audio decoding start signal.

Video buffer 6 (FIG. 6B) preferably is in the form of a first-in first-out (FIFO) memory and supplies separated video data to video decoder 7. When comparator 23 produces the video decoding start signal, the video decoder begins to decode the video data temporarily stored in video buffer 8.

Similarly, audio buffer 8 may be a FIFO memory; and supplies the audio data separated by data separator 21 to audio decoder 9. When comparator 25 produces the audio decoding start signal, the audio decoder is enabled to begin decoding the audio data temporarily stored in audio buffer 8.

FIG. 6A also illustrates a control circuit 28, which may be a central processing unit, coupled to data separator 21 to supply various control command signals thereto. Control circuit 28 responds to operator-generated input signals produced by an input section 29 for controlling the overall operation of the data reproducing apparatus. For example, an operator may activate input section 29 to produce those signals that are typical in optical disk drive devices, such as play, stop, pause, skip, etc. FIG. 6A illustrates that input section 29 also is coupled to disk drive 1 so as to supply such operator-generated input signals thereto.

FIG. 8 is a schematic timing diagram of the timing relationship between the operation of data separator 21 and the video and audio decoders 7 and 9. Let it be assumed that a PLAY signal is produced by input section 29, whereupon control circuit 28 supplies a demultiplexing instruction to data separator 21. Let it be further assumed that data separator 21 begins its demultiplexing operation at time $t_1$ (FIG. 8) and, for convenience, this time $t_1$ may be equal to the system clock reference SCR. Accordingly, clock register 26 is preset with this clock value $t_1$. Line A in FIG. 8 illustrates the video data being written into video buffer 6; and it is appreciated that the slope of line A corresponds to the transfer rate at which such video data is written therein. Time $t_2$ represents the video decoding time stamp DTSV. Hence, when clock register 26 is incremented from clock value $t_1$ to clock value $t_2$, comparator 23 supplies the video decoding start signal to video decoder 7, whereupon a unit of video data which had been temporarily stored in video buffer 6 is decoded. As shown in FIG. 8, this unit is equal to one video frame, or one video picture.

In FIG. 8, line B, which is a discontinuous line, represents the video data which is read from video buffer 6 and decoded by video decoder 7. FIG. 8 also illustrates the capacity of video buffer 6. It will be recognized that buffer overflow may occur if the rate at which video data is read from video buffer 6 is too slow, that is, it is less than the rate at which video data is written therein. Conversely, buffer underflow may occur if the contents of the video buffer are read out before a new frame is written therein. The shaded area beneath line A schematically illustrates the amount of video data remaining in video buffer 6.

Video decoder 7 produces a vertical synchronizing signal when a complete frame of video data has been decoded. If the video decoder is coupled to a suitable video display, a delay is imparted (VIDEO DECODE DELAY) to the decoded video signal prior to its display. This delayed relationship also is illustrated in FIG. 8.

It will be appreciated that the timing relationship depicted in FIG. 8 and described above in connection with the video decoding channel is equally applicable to the audio decoding channel. However, the timing relationship, referred to herein as the synchronization relationship, between video decoder 7 and audio decoder 9 is dependent upon the presetting of clock register 26 by the system clock reference SCR and the incrementing of the clock register to system clock values that are equal to the video and audio decoding time stamps, respectively. But, since the video and audio decoding time stamps are separated by data separator 21, any variations in the synchronization relationship between the video and audio data that might occur in or be attributed to the video and audio buffers will go undetected. One example of a synchronization error that may occur in the apparatus shown in FIGS. 6A and 6B and that will not be detected and, thus, not corrected, now will be described.

Let it be assumed that the data which is reproduced from the disk drive exhibits a high error rate such that ECC circuit 3 is unable to correct such errors. Referring to FIG. 9A, let it be assumed that successive picture intervals reproduced from the optical disk are pictures P12, B11, P14, B13, I1, B0, P3 and B2, wherein the numeral represents the picture interval and the letter represents the usual MPEG characterizations, namely I refers to an intraframe encoded video picture, P refers to a forward predictive encoded video picture and B refers to a bidirectionally predictive encoded video picture. Assuming no uncorrectable errors, video decoder 7 decodes the video data included in the successive picture intervals supplied thereto and rearranges the decoded data in the proper picture sequence shown in FIG. 9B. Consistent with the MPEG standard, a group of pictures (GOP) is comprised of fourteen pictures, or picture intervals, and the number of the first picture included in a GOP is reset to 0.

Let it be assumed that an uncorrectable error occurs in reproduced picture interval P14, as shown in FIG. 9C. For example, video packet header information may be lost. Since video decoder 7 cannot decode video picture P14, the video decoder simply skips this picture and, as shown in FIG. 9D, decodes picture intervals P12, B11, B13, I1, B0, P3 and B2 as if picture P14 never was present. Consequently, the output of the video decoder appears as shown in FIG. 9E. However, when FIG. 9E is compared to FIG. 9B, it is seen that the decoded picture sequence is advanced by one picture interval when an error which prevents the decoding of picture P14 is present. But, since a similar error was not present in the audio data, audio decoder 9 does not similarly advance the units of audio data decoded thereby. Hence, the decoded video and audio data now exhibit loss of synchronization therebetween.

Because data separator 21 operates to separate the video and audio decoding time stamps from the multiplexed data supplied by ring buffer 4, it is structurally difficult to reestablish synchronization between the video and audio data supplied to video and audio buffers 6 and 8 from data separator 21 when, as described above, a unit of video data is lost but a unit of audio data is not. Accordingly, to reestablish synchronization between the video and audio data in the presence of the aforementioned error requires relatively complicated processing downstream of the video and audio buffers.

Another example of a condition which requires resynchronization is described with reference to a "pause" operation, the timing relationship of which is illustrated in FIGS. 10A–10C. In the absence of errors, and during a normal play operation, video and audio data are decoded and displayed in the manner shown in FIG. 10A. As before, a unit of video data corresponds to a video picture, or picture interval, and a unit of audio data is comprised of a predetermined number of samples of the audio information (as one example, 512 samples comprise one unit of audio data). It is clearly seen that the length of one unit of video data is greater than the length of one unit of audio data. Moreover, there is no integral multiple relationship between the length of a unit of video data and the length of a unit of audio data ($L_v \approx nL_A$, where $L_v$ is the length of a unit of video data, $L_A$ is the length of a unit of audio data and is an integral number). As is apparent from FIG. 10A, the synchronization relationship between the video and audio data thus varies continually. However, and with reference to an arbitrary picture interval, FIG. 10A illustrates a time difference $t_d$ between the beginning of picture interval P14 and the beginning of unit A10 of audio data.

Let it be assumed that the user of the reproducing apparatus shown in FIGS. 6A and 6B initiates a pause operation during the time that picture interval B13 is displayed, as illustrated in FIG. 10B. As a result of this pause operation, picture interval B13 is repeatedly displayed. Audio decoder 9 decodes units A7, A8 and A9 of audio data; but since unit A10 accompanies picture interval P14 and since picture P14 is not decoded and displayed, a muting condition exists after unit A9 of audio data is decoded. This muting condition also is illustrated in FIG. 10B and coincides with the repeated display of picture B13.

When the pause operation ends, as shown in FIG. 10C, the next picture interval P14 is displayed; and at a time $t_d$ following the beginning of picture interval P14, the next unit A10 of audio data is decoded. For proper synchronization between the video and audio data, decoding of unit A10 must begin at the delayed time $t_d$ following the beginning of picture P14.

However, in the reproducing apparatus shown in FIGS. 6A and 6B, picture interval P14 and unit A10 of audio data are separated early on from the multiplexed data reproduced from the optical disk and, likewise, the video and audio decoding time stamps are stored early on in registers 22 and 24. With the separated video picture P14 stored in video buffer 6, the separated unit A10 of audio data stored in audio buffer 8, the video decoding time stamp DTSV stored in register 22 and the audio decoding time stamp DTSA stored in register 24, the time difference $t_d$ between the beginning of video picture P14 and unit A10 of audio data is quite difficult to detect. Hence, and since this delay $t_d$ is variable, as discussed above, it is difficult to restore proper synchronization to the video and audio data at the conclusion of a pause operation.

Another drawback associated with the apparatus shown in FIGS. 6A and 6B occurs when disk drive 1 operates to re-read data from, for example, a particular sector because a high error rate has prevented the originally read data from being properly interpreted. For instance, if the disk drive is subjected to shock, vibration or mechanical interference whereby data which is read from a portion of the disk appears as an uncorrectable error, control circuit 28 may, in response to this uncorrectable error, command the disk drive to re-read the same portion of the record medium. Typically, such re-reading results in corrected data which then may be accurately decoded. For example, if the disk drive is a CD-ROM, up to a maximum of 300 milliseconds may be required to access and re-read the same portion of the disk. But, during the re-read operation, the supply of new video and audio data to video and audio buffers 6 and 8 is interrupted. Nevertheless, the data that had been stored previously therein is decoded. As a consequence, the contents of ring buffer 4, video buffer 6 and audio buffer 8 may be exhausted before new data is supplied thereto. This underflow condition may result in noticeable interruptions in the displayed video picture and audio sound; and constitutes a drawback that desirably should be avoided.

OBJECTS OF THE INVENTION

Therefore, it is an object of the present invention to provide data reproducing apparatus which avoids the aforenoted drawbacks, disadvantages and defects of other proposals.

Another object of this invention is to provide data reproducing apparatus which reproduces multiplexed video and audio data and detects and corrects synchronization errors that may be present therebetween.

A further object of this invention is to provide apparatus of the aforenoted type which facilitates the recovery of proper synchronization between reproduced video and audio data at the conclusion of a pause operation.

An additional object of this invention is to provide apparatus of the aforenoted type which avoids the occurrence of an underflow condition in the event that data is re-read from a portion of a record medium.

Still another object of this invention is to provide apparatus of the aforenoted type which selectively provides a wait or a skip operation in the decoding of video pictures in the event of a detected loss of synchronization.

Another object of this invention is to provide apparatus of the aforenoted type in which re-synchronization following a pause operation and following a re-read operation are carried out in similar fashion.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for reproducing video data from a record medium on which is recorded, in multiplexed form, the video data, reference time data representing a reference time, and video time data representing the time at which decoding of the video data reproduced from the record medium should begin. The reference time data is separated from the multiplexed data and used to generate timing data. The video data and video time data which are reproduced from the record medium are stored in a video buffer, and the video time data in that buffer is extracted. The buffer is connected to a video decoder which decodes the video data temporarily stored in the buffer; and the operation of the video decoder is controlled as a function of a comparison between the generated timing data and the extracted video time data.

As a feature of this invention, decoding of the video data is initiated when the generated timing data is substantially equal to the extracted video time data. A synchronizing error is indicated when the generated timing data and the extracted video time data differ from each other by at least a predetermined amount. As an aspect of this invention, if the extracted video time data exceeds the generated timing data by at least this amount, the decoding of video data by the video decoder is delayed by a picture interval, that is, the video decoder is caused to wait. Conversely, if the generated timing data exceeds the extracted video time data by at least the aforementioned predetermined amount, the video decoder skips to the next video picture to carry out a decoding operation thereon.

As another feature of this invention, the multiplexed data recorded on the record medium also includes audio data and audio time data representing the time at which decoding of the reproduced audio data should begin. The apparatus further includes an audio buffer for temporarily storing the audio data and audio time data which are reproduced from the record medium, an audio time data extractor for extracting the audio time data from the reproduced audio data, and an audio decoder for decoding the reproduced audio data temporarily stored in the audio buffer, the audio decoder being controlled as a function of a comparison between the generated timing data and the extracted audio time data.

As yet another feature of this invention, an interrupt command may be generated to temporarily interrupt the reproduction of new multiplexed data from the record medium. The video decoder responds to the interrupt command to delay until the interrupt command terminates the decoding of the next picture interval of video data. As an aspect of this feature, the timing data is frozen for the duration of the interrupt command and the decoder is inhibited from decoding the video data of the next picture interval when the extracted video time data is greater than the frozen timing data. The generation of timing data resumes when the interrupt command terminates; and once the timing data exceeds the extracted video time data, the video decoder then decodes the next picture interval.

As yet another feature of this invention, a re-read command may be generated to cause a portion of the record medium to be re-read and, concurrently, to cause the video decoder to delay the decoding of video data in the video buffer until the re-read video data is supplied thereto. As an aspect of this feature, the timing data is frozen until the re-read video data is supplied to the video buffer; and the video decoder is inhibited from decoding video data when the extracted video time data is greater than the frozen timing data. The generation of timing data is resumed when the re-read data is supplied to the video buffer; and the video decoder is enabled when the generated timing data exceeds the extracted video time data.

A significant feature of the present invention is the connection of the video time data extractor to the output of the video buffer such that the video time data is extracted immediately upstream of the video decoder. Similarly, the audio time data extractor is connected to the output of the audio buffer such that audio time data is extracted immediately upstream of the audio decoder. Consequently, synchronization errors may be detected easily and accurately. This also permits the ready detection of an overflow or underflow condition of the video buffer merely by comparing the extracted video time data with the generated timing data. Likewise, the presence of an overflow or underflow condition of the audio buffer may be easily detected simply by comparing the extracted audio time data with the generated time data. Furthermore, synchronization between the video and audio data may be determined simply by comparing the extracted video time data with the extracted audio time data.

BRIEF DESCRIPTION OF THE DRAWINGS

The following detailed description, given by way of example, and not intended to limit the present invention solely thereto, will best be understood in conjunction with the accompanying drawings in which:

FIGS. 1, 1A and 1B comprise a block diagram of data reproducing apparatus which incorporates the present invention;

FIG. 2 is a schematic illustration of the structure of the data stored in audio buffer 8A of FIG. 1B;

FIGS. 3A–3F are timing diagrams which are useful in understanding the advantages derived from the present invention;

FIGS. 4, 4A and 4B comprise a block diagram of data reproducing apparatus similar to that shown in FIGS. 1, 1A and 1B, but with certain modifications thereto;

FIGS. 5A–5D are timing diagrams which are useful in understanding the advantages derived from the present invention as incorporated into the embodiment of FIGS. 4A and 4B;

FIGS. 9A–9E and 10A–10C are timing diagrams which are useful in explaining the drawbacks and disadvantages associated with the data reproducing apparatus of FIGS. 6, 6A and 6B.

DETAILED DESCRIPTION OF PREFERRED EMBODIMENTS

Figure 1A:
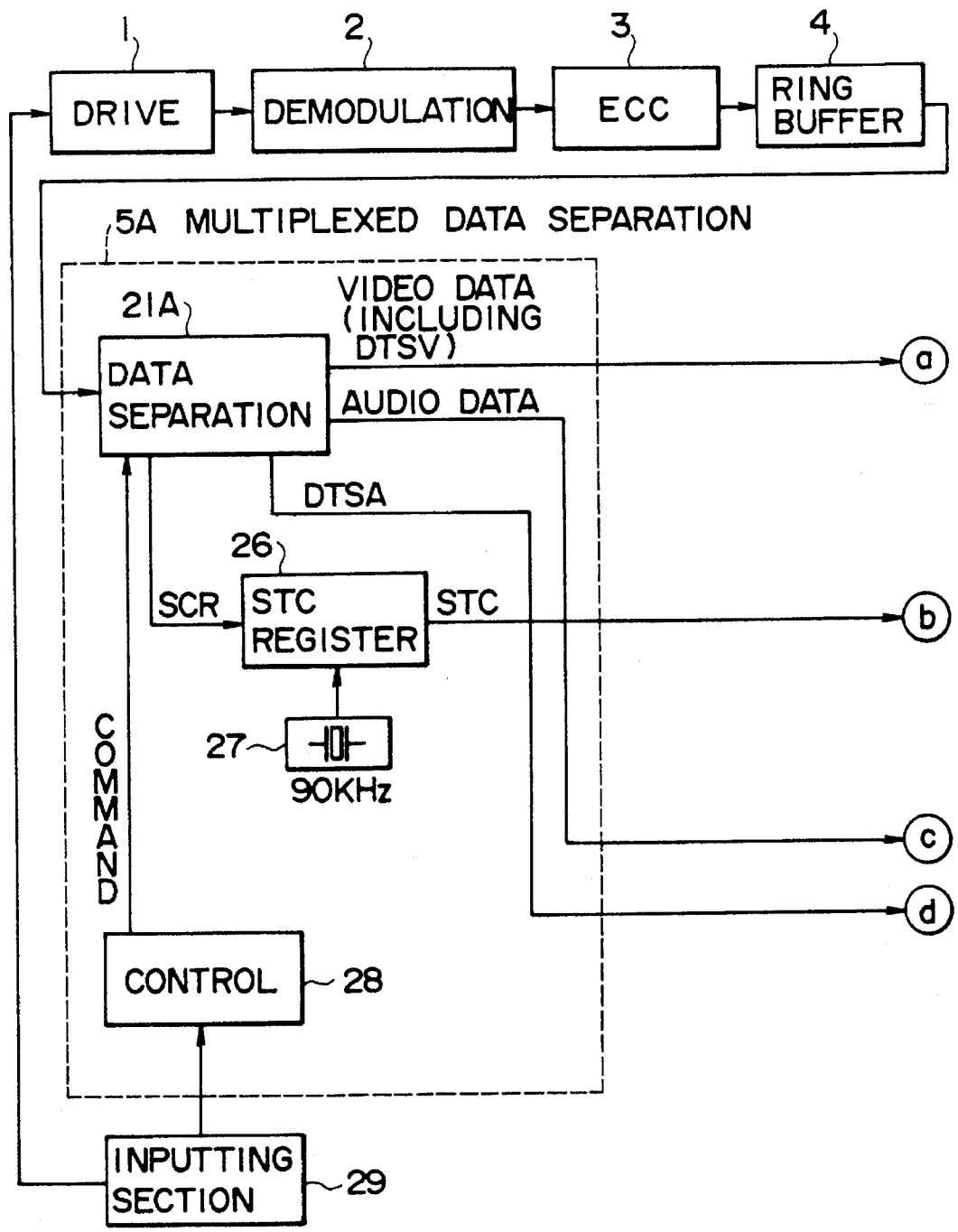
Figure 6A:
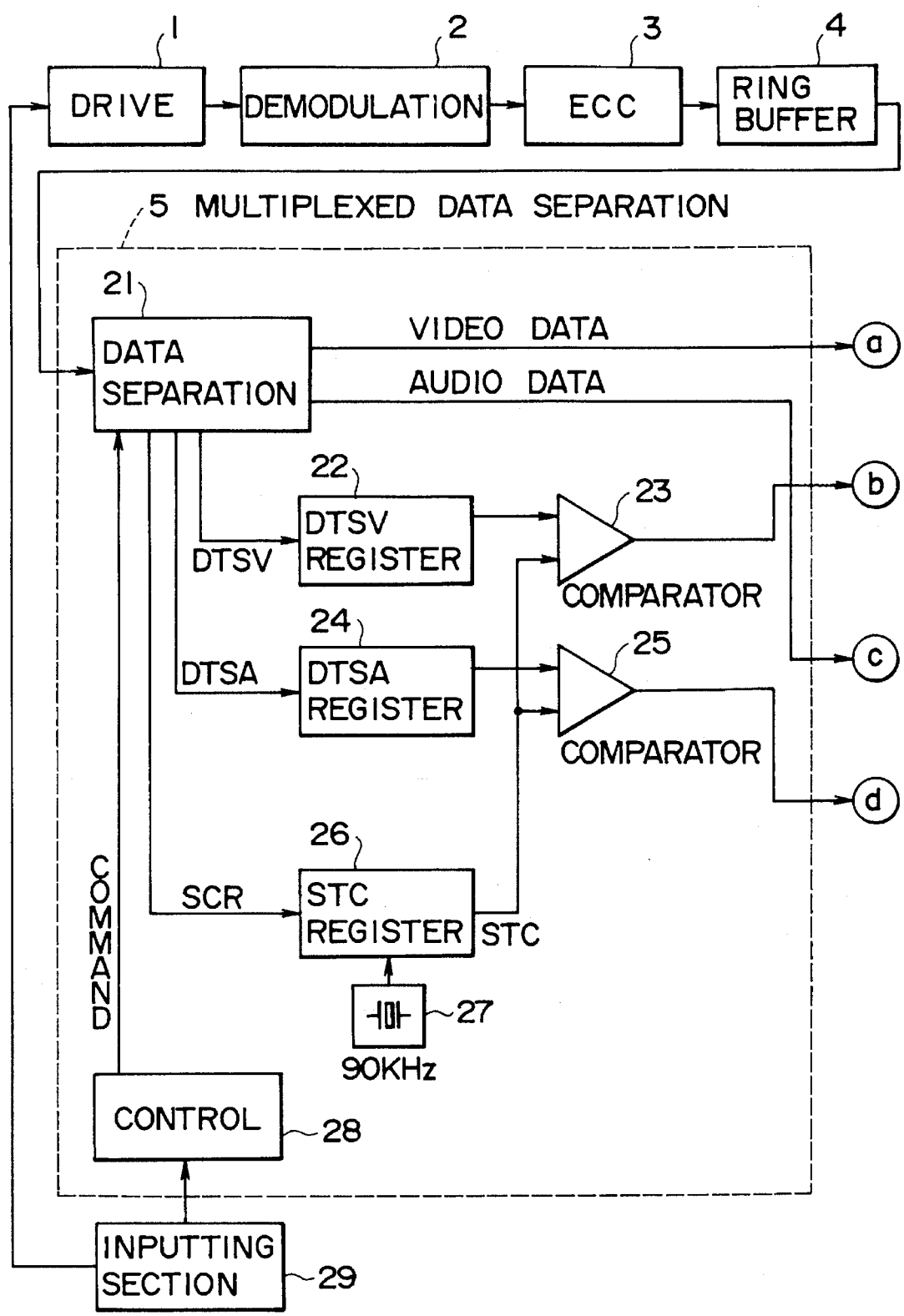
FIGS. 6, 6A and 6B are a block diagram of data reproducing apparatus heretofore proposed.
Figure 6B:
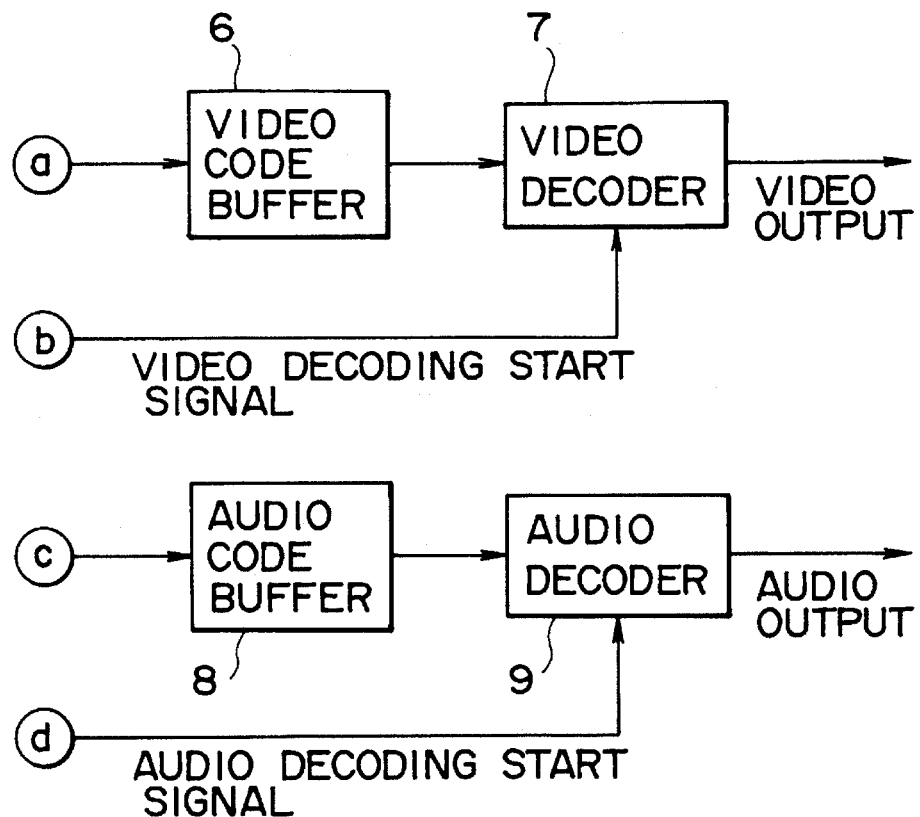
Figure 6:
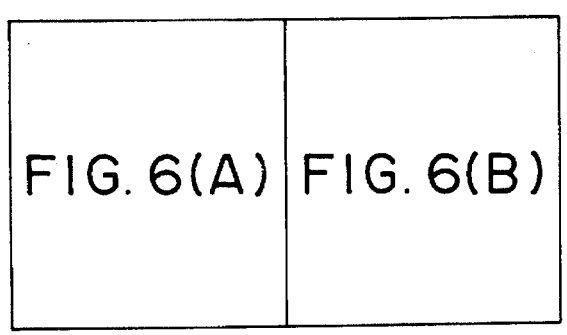

Referring now to the drawings, wherein like reference numerals are used throughout, FIGS. 1A and 1B, when arranged as shown in FIG. 1, comprise a block diagram illustrative of data reproducing apparatus in which the present invention finds ready application. It will be appreciated that the data reproducing apparatus shown in FIGS. 1A and 1B is quite similar to that shown in FIGS. 6A and 6B; and for convenience and simplification, and in an effort to avoid unnecessary duplication, only those differences between the apparatus previously described with respect to FIGS. 6A and 6B and the apparatus now described in connection with FIGS. 1A and 1B will be explained. Demultiplexer 5A in FIG. 1A differs from demultiplexer 5 in FIG. 6A in that demultiplexer 5A does not include video decoding time stamp register 22, audio decoding time stamp register 24 or comparators 23 and 25. Rather, demultiplexer 5A includes a data separator 21A which, as opposed to data separator 21, does not separate video decoding time stamp data DTSV from the encoded video data. For a reason discussed below, data separator 21A demultiplexes the audio data and the audio decoding time stamp data DTSA but, as will be discussed, the demultiplexed audio data and audio decoding time stamp data are stored in an audio buffer 8A (FIG. 1B) in a manner which, nevertheless, retains the timing relationship therebetween.

Data separator 21A also separates the system clock reference SCR which is used to preset clock register 26, the latter being incremented in response to a 90 KHz clock signal generated by clock generator 27 to generate the timing data STC of the system time clock.

Figure 7:
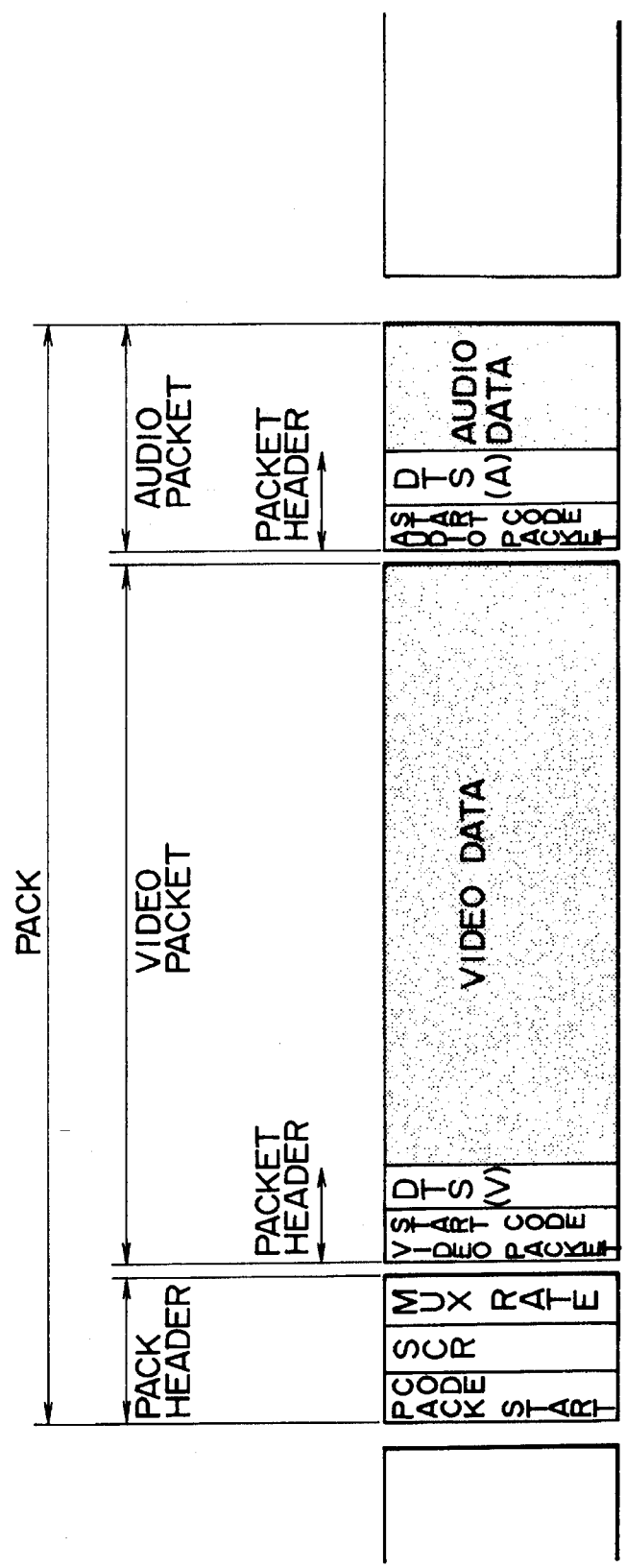
FIG. 7 is a schematic representation of the multiplexed data format of the data reproduced in the apparatus of FIGS. 1, 4 and 6.
Figure 8:
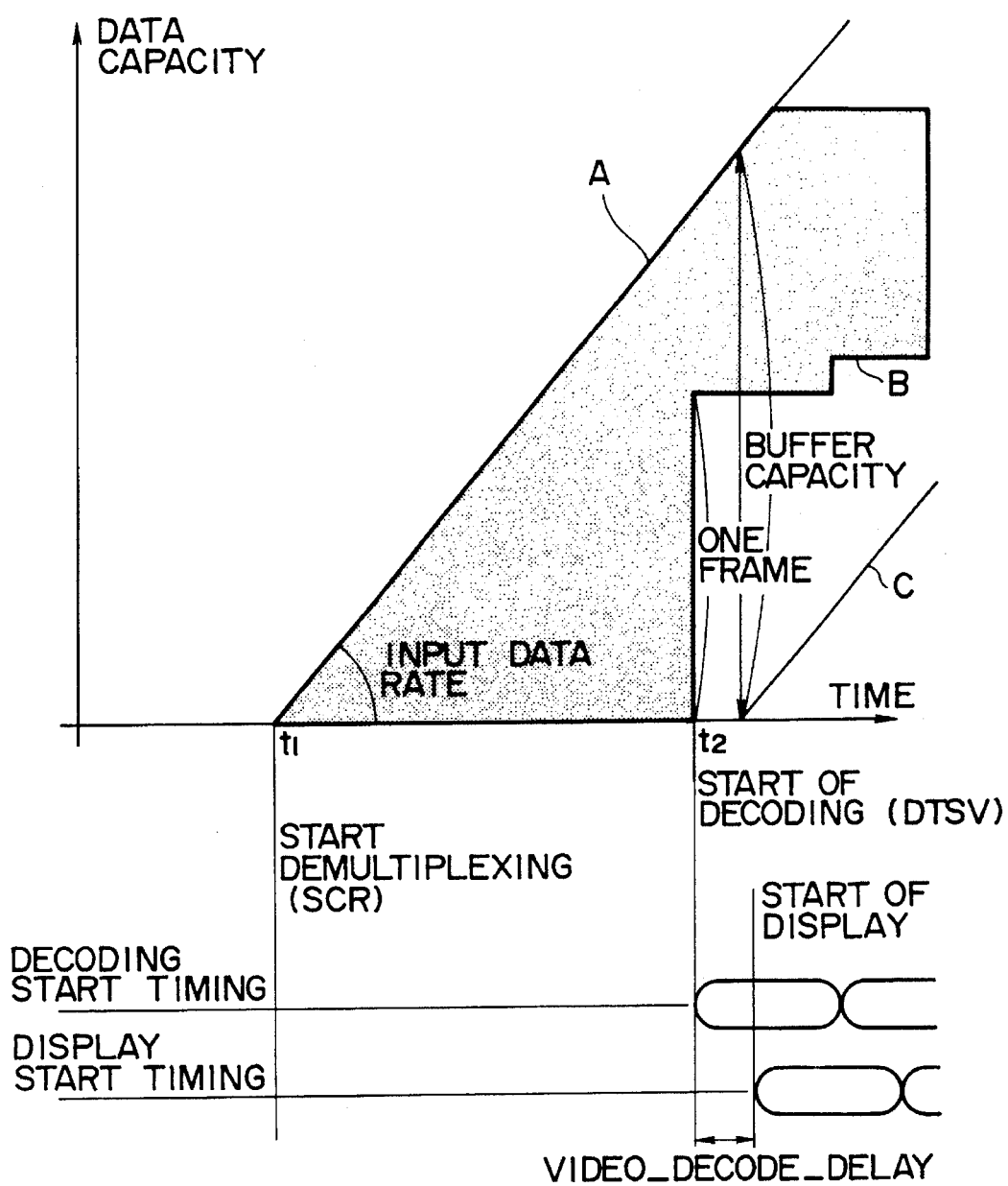
FIG. 8 is a schematic representation of timing relationships which are useful in understanding the manner in which the data reproducing apparatus of FIGS. 6, 6A and 6B operates.

Video buffer 6A of FIG. 1B is similar to aforedescribed video buffer 6 and is coupled to data separator 21A to receive therefrom the video data and the video decoding time stamp data DTSV in their time division multiplexed form (as shown in FIG. 7). The output of the video buffer is coupled to a video decoding time stamp extractor 30 which is adapted to extract from the multiplexed video data temporarily stored in video buffer 6A the video decoding time stamp data DTSV. The video buffer also is connected to video decoder 7 to supply to the video decoder the video data from which the video decoding time stamp data has been extracted. Thus, and contrary to the previously proposed apparatus shown in FIGS. 6A and 6B, the video decoding time stamp data and the video data are stored together in video buffer 6A, thus preserving their synchronizing relationship, and the video decoding time stamp data DTSV is not extracted until the video data is supplied to video decoder 7.

A synchronization control circuit 31 (FIG. 1B) is coupled to clock register 26 to receive therefrom the timing data generated by the clock register as the preset count therein is incremented in response to the 90 KHz clock signals supplied by clock generator 27. The synchronization control circuit also is coupled to video decoding time stamp extractor 30 and, as one example, may include coincidence detectors to detect when the timing data generated by the clock register has been incremented to be equal to the extracted video decoding time stamp data DTSV. As will be described, synchronization control circuit 31 also is adapted to determine when the extracted video decoding time stamp data exceeds the generated timing data (DTSV>STC) and also to determine when the generated timing data is greater than the extracted video decoding time stamp data (STC>DTSV). A control signal is supplied from the synchronization control circuit to video decoder 7 to control the operation of the video decoder in response to the detected synchronization relationship of the video data, that is, and as one example thereof, the operation of the video decoder is controlled as a function of the relationship between the generated timing data STC and the extracted video decoding time stamp data DTSV.

Data separator 21A demultiplexes the audio decoding time stamp data DTSA from the audio data which are supplied thereto in an audio packet from ring buffer 4 for the reason now to be described. As mentioned above, the construction of the reproduced video and audio data is, as shown in FIG. 7, established by the MPEG standard. In accordance with this standard, it is possible that the bit pattern of the AUDIO PACKET START CODE included in the audio packet header may appear as actual information data. Consequently, if the audio data and the audio decoding time stamp data DTSA are maintained in their multiplexed form in audio buffer 8A, there is the possibility that actual information may be misinterpreted as an AUDIO PACKET START CODE, thereby introducing errors into the AUDIO PACKET START CODE detection operation. As a result, the audio decoding time stamp data DTSA, whose detection is dependent upon proper detection of the AUDIO PACKET START CODE, may not be sensed. Therefore, to avoid this possibility, data separator 21A operates as a time division demultiplexer for the audio data, thereby assuring proper separation and detection of the audio decoding time stamp data DTSA. As is seen from FIGS. 1A and 1B, the separated audio data and audio decoding time stamp data DTSA are supplied to separate inputs of audio buffer 8A; and as will now be explained with reference to FIG. 2, the synchronization relationship between the audio data and the audio decoding time stamp data DTSA nevertheless is maintained in audio buffer 8A, notwithstanding this separation.

As seen in FIG. 2, the audio information stored in audio buffer 8A (as used herein, the expression "audio information" means both the separated audio data and the audio decoding time stamp data DTSA) is identified by a flag bit. In particular, this flag bit is affixed to each audio information character (such as an audio information byte) and identifies audio data when the flag bit is reset to "0" and audio decoding time stamp data DTSA when the flag bit is set to "1". Thus, even though data separator 21A has demultiplexed the audio decoding time stamp data and the audio data, such demultiplexed audio information nevertheless is stored in audio buffer 8A with their original timing relationship, as represented by the flag bits of the audio information characters shown in FIG. 2. Hence, both audio buffer 8A and aforedescribed video buffer 6A maintain the synchronization relationship of the audio and video data respectively stored therein by reason of the fact that these buffers also store the audio and video decoding time stamp data of their respective audio and video packets.

Audio buffer 8A is similar to aforedescribed audio buffer 6 and is connected to audio decoding time stamp extractor 32 which is adapted to extract from the contents of the audio buffer the audio decoding time stamp data DTSA. The audio buffer also is connected to audio decoder 9 to supply thereto the temporarily stored audio data for decoding. It is appreciated that, in the reproducing apparatus shown in FIGS. 1A and 1B, the audio decoding time stamp data DTSA is maintained with the audio data until the audio data is supplied to audio decoder 9, thereby maintaining the synchronization relationship of the audio data.

The extracted audio decoding time stamp data DTSA is supplied by extractor 32 to synchronization control circuit 31 for comparison with the timing data STC generated by clock register 26. The synchronization control circuit senses when the timing data has been incremented to a value equal to the extracted audio decoding time stamp data (STC=DTSA), and also senses when the audio decoding time stamp data DTSA is greater than the timing data (DTSA>STC) and when the timing data is greater than the audio decoding time stamp data (STC>DTSA). The operation of audio decoder 9 is controlled as a function of this detected synchronization relationship, that is, the relationship between the timing data STC and the extracted audio decoding time stamp data DTSA. In addition, synchronization control circuit 31 functions to compare the value of the extracted video decoding time stamp data to the value of the extracted audio decoding time stamp data for the purpose of detecting and correcting a synchronization error between the video and audio decoders.

The manner in which the reproducing apparatus illustrated in FIGS. 1A and 1B operates now will be described with reference to FIGS. 3A–3F. Let it be assumed that video and audio data are recorded on a record medium, such as an optical disk, in the MPEG format shown in FIG. 7. Let it be further assumed that the recorded video data represents successive picture intervals P12, B11, P14, B13, I1, B0, P3 and B2, as illustrated in FIG. 3A. It is further assumed that the video decoding time stamp data that is recorded in the video packet header at the beginning of each of these picture intervals is, as illustrated in FIG. 3A, represented by the values N+0, N+3003, N+6006, N+9009, . . . N+X(3003), where x represents the succession of picture intervals. Since clock generator 27 generates a 90 KHz clock signal, and since the video frame rate (or picture interval rate) in the NTSC system is 29.97 Hz, then the number of clock signals which are generated in a frame or picture interval is 90 KHz/29.97 Hz=3003.

The multiplexed video and audio data reproduced from the record medium by, for example, disk drive 1, are demodulated, subjected to error sensing and correction by ECC circuit 3 and stored in ring buffer 4. The multiplexed data are read from the ring buffer to demultiplexer 5A; and data separator 21A supplies to video buffer 8A the video data and video decoding time stamp data DTSV (which maintain their time division multiplexed form and, thus, maintain their synchronization relationship) and also supplies to audio buffer 8A the demultiplexed audio data and audio decoding time stamp data DTSA which, nevertheless, and as has been described above, also maintain their synchronization relationship. Data separator 21A also separates the system clock reference SCR from the reproduced multiplexed data to preset clock register 26 with this reference value. This preset value is incremented by the 90 KHz clock signal generated by clock generator 27 to produce timing data STC which is compared, in synchronization control circuit 31, to the extracted video decoding time stamp data DTSV and also to the extracted audio decoding time stamp data DTSA supplied thereto by extractors 30 and 32, respectively. In FIG. 3A, the value of the generated timing data is illustrated along the horizontal axis below the value of the extracted video decoding time stamp data DTSV. When STC=DTSV, synchronization control circuit 31 supplies a suitable signal to video decoder 7 (e.g. a start signal, an enable signal, a control command, or the like), whereupon the video decoder begins to decode the video data stored in video buffer 6A. The decoded video data is supplied as a video output signal to further apparatus, not shown, (such as a video display device). Although not specifically illustrated and described herein, it will be appreciated that, in a similar manner, audio decoder 9 is controlled by synchronization control circuit 31 to decode the audio data stored in audio buffer 8A when STC=DTSA.

FIG. 3B illustrates the output of video decoder 7, also referred to herein as the display output, and it is seen that the decoded video pictures are restored to their original sequence, namely B11, P12, B13, P14, B0, I1, B2 and P3. For consistency, it is appreciated that the picture intervals which are supplied to decoder 7 in FIG. 1B are the same as the picture intervals shown in FIG. 9A (and supplied to decoder 7 of FIG. 6B), and the decoder output shown in FIG. 3B is the same as the decoder output shown in FIG. 9B. This consistency is maintained to best appreciate the advantages of the present invention.

Now, let it be assumed that an uncorrectable error is present in reproduced picture interval P14, as represented by the "X" in FIG. 3C. As an example, the video packet header information of picture interval P14 may be lost, thereby making it impossible to recover and display this picture. It will be recalled that this same error condition was assumed when describing FIG. 9C. Accordingly, since picture interval P14 is not reproduced, ring buffer 4 supplies to data separator 21A picture interval B11 followed by picture interval B13, thereby omitting picture interval P14, as shown in FIG. 3D. However, although the video data of picture interval P14 is not supplied to data separator 21A, it is assumed that the pack header of this picture interval is and, therefore, data separator 21A separates the system clock reference SCR from this supplied data, thereby presetting clock register 26 with this value. Alternatively, the clock register may be phase-lock controlled so as to increment to this value.

But, since the video data of picture interval P14 is not supplied by ring buffer 4, data separator 21A next receives the video data of picture interval B13. This video data is transferred to video buffer 6A by the data separator and the video decoding time stamp data DTSV is extracted therefrom and supplied to synchronization control circuit 31. As is seen from FIGS. 3A and 3D, the video decoding time stamp data of picture interval B13 is assumed to be DTSV= N+9009.

Clock register 26, which had been preset by (or incremented to) the system clock reference SCR associated with picture interval P14 is incremented, and the timing data thus generated by the clock register is assumed herein to be incremented to a value STC=N+6006. Synchronization control circuit 31 compares the extracted video decoding time stamp data DTSV to the generated timing data STC and senses when DTSV−STC=3003. That is, the synchronization control circuit detects when the difference between the extracted video decoding time stamp data and the generated timing data differ from each other by an amount substantially equal to a video frame, or picture interval. Consequently, the synchronization control circuit determines that a synchronization error has occurred in the decoding of the video data and supplies a "wait" control signal to video decoder 7, thereby delaying for one picture interval the decoding of the video data stored in video buffer 6A. This control over the video decoder is schematically illustrated in FIG. 3E wherein the decoding of the video data stored in video buffer 6A, namely the video data of picture interval B13, is delayed by one picture interval. As a result of this delay, the proper synchronization relationship between the timing data generated by clock register 26 and the extracted video decoding time stamp data is restored.

As shown in FIG. 3F, while the decoding of picture interval B13 is delayed by one picture interval, the previously decoded picture interval simply is repeated, thereby avoiding a discontinuity in the video pictures being displayed. Stated otherwise, the "gap" formed by delaying the decoding of picture interval B13 is "filled" by repeating the previously decoded picture.

It is recognized from the foregoing discussion that in the event of an uncorrectable error which makes it impossible to reproduce a unit of video data (i.e. a picture interval), the video decoder is controlled to delay, or wait, by one unit. Similarly, if an uncorrectable error makes it impossible to recover a unit of audio data (as described herein, one unit has been assumed to be comprised of 512 audio samples, although the length of an audio unit is not necessarily limited to this amount), synchronization control circuit 31 controls audio decoder 9 so as to delay the decoding of audio data by one or more audio units. To prevent, or at least minimize, the occurrence of undesired or disagreeable sounds, which may be sensed as "clicks" or other harsh noise, audio muting is performed for a duration prior to and after the location of the error.

The foregoing discussion has explained the manner in which synchronization error correction is attained by delaying the operation of video decoder 7 or audio decoder 9. If, however, an erroneous video decoding time stamp DTSV is reproduced, for example, if a portion of the video decoding time stamp data is obliterated and this error is not corrected, synchronization control circuit 31 controls video decoder 7 to "skip" its decoding operation by one video unit. For example, if STC−DTSV=3003, the video decoder skips to the next unit of video data to be loaded into video buffer 6A and does not decode the video data that had been previously stored therein.

A comparison of the video decoding time stamp data DTSV to the timing data STC generated by clock register 26 may be useful in anticipating an underflow or overflow condition of video buffer 6A. For example, the condition DTSV>STC may signify that the video decoding operation is advanced, and this possibly may result in a buffer underflow condition. Correction for such a possible underflow is achieved simply by supplying a delay instruction to video decoder 7 from synchronization control circuit 31, thereby restoring the proper synchronization relationship. Conversely, if DTSV<STC, the possibility of a buffer overflow condition is indicated. This overflow may be corrected simply by supplying to video decoder 7 from synchronization control circuit 31 a skip instruction. This overflow/ underflow indication is easily sensed because the video decoding time stamp data remains in its multiplexed form with the video data in video buffer 6A and is not separated upstream thereof by data separator 21A (as is the case in the arrangement shown in FIGS. 6A and 6B). That is, since the timing relationship of the video data is maintained in the video buffer, the extraction of the video decoding time stamp data therefrom permits a simple and ready indication of possible buffer underflow or overflow.

In similar manner, a possible underflow or overflow condition of audio buffer 8A may be sensed by determining if DTSA>STC or DTSA<STC. Correction may be attained by controlling audio decoder 9 to delay or skip its decoding operation; and to prevent the occurrence of a disagreeable sound because of such delay or skip, muting is performed for a duration prior to and following the detection of the synchronization error.

In the embodiment described herein, the video decoding time stamp extractor 30 is connected directly to the output of video buffer 6A and is disposed in a stage upstream of video decoder 7. Similarly, audio decoding time stamp extractor 32 is connected directly to the output of audio buffer 8A and is disposed in a stage that is immediately upstream of audio decoder 9. As an alternative, extractors 30 and 32 may be disposed directly in decoders 7 and 9, respectively.

As a further modification to the aforedescribed embodiment, the video and audio decoding time stamp data may be replaced by alternative, yet equivalent, time data known as presentation time stamp (PTS) data. Such presentation time stamp data may be disposed in some, although not necessarily all, packet headers to represent the time at which the video or audio unit in that packet should be displayed. It will be recognized that a predetermined relationship exists between the presentation time stamp and the time at which decoding of the video data or audio data should begin. Hence, extractors 30 and 32 may include appropriate conversion circuits to convert the presentation time stamp data to video and audio decoding start signals, respectively.

Figure 4A:
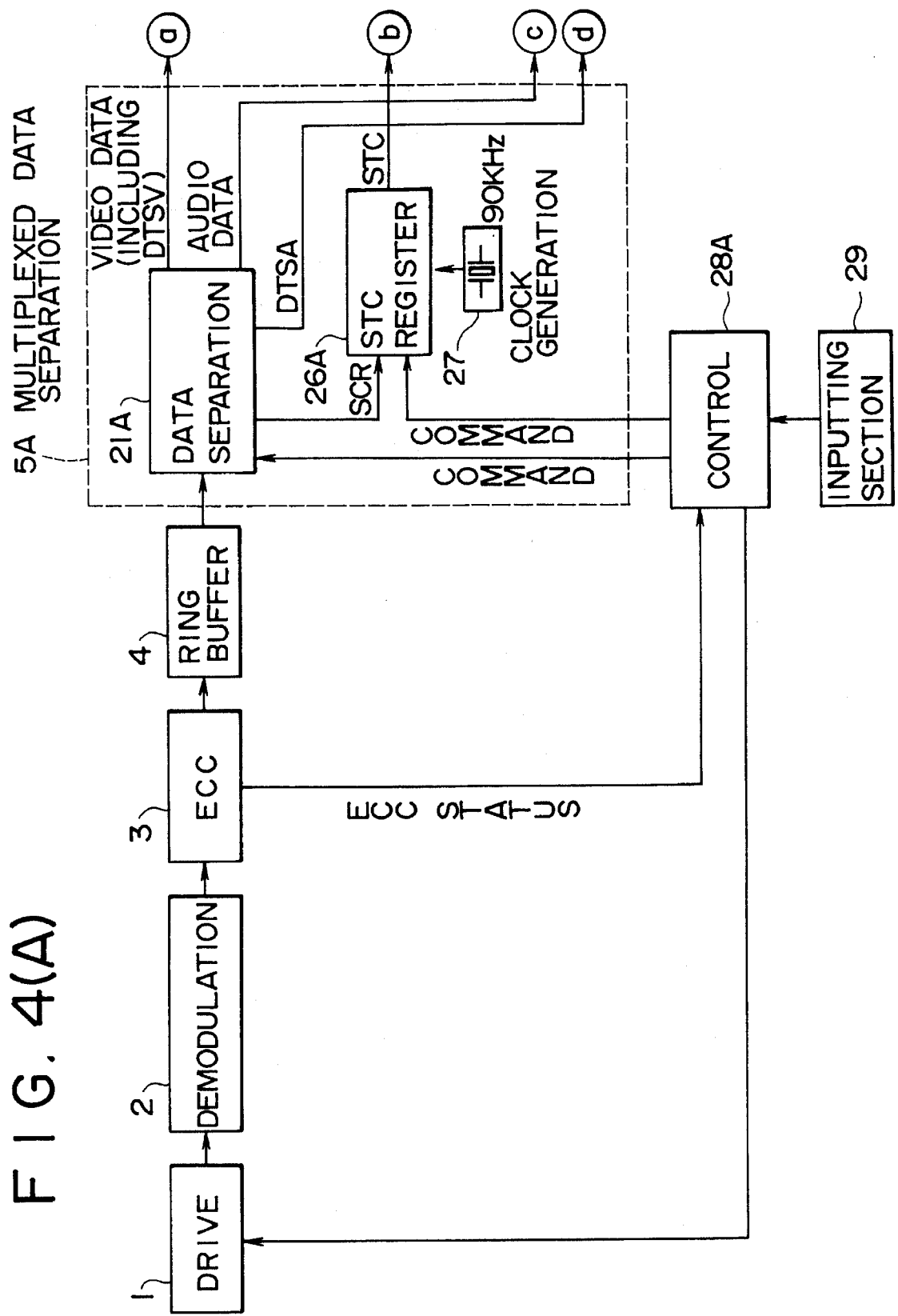

A modification of the embodiment shown in FIGS. 1A and 1B now will be described in conjunction with the block diagram of FIGS. 4A and 4B, arranged as shown in FIG. 4. The significant difference between these embodiments is seen by comparing FIG. 4A to FIG. 1A. In FIG. 1A, control circuit 28 receives input signals from input section 29 and supplies corresponding instructions to data separator 21A, such as play, pause, etc. As also shown in FIG. 1A, such input signals as are generated by input section 29 are supplied to disk drive 1 to initiate a corresponding reproduction operation. It is also seen that the arrangement between input section 29, control circuit 28 and disk drive 1 in FIG. 1A is substantially the same as that shown in FIG. 6A. However, in FIG. 4A, input section 21 is coupled only to control circuit 28A which, in turn, supplies corresponding command instructions to disk drive 1, data separator 21A and clock register 26A. As also seen from FIG. 4A, control circuit 28A receives a status indication from ECC circuit 3 which is indicative of an error condition that cannot be corrected. Accordingly, to make it clear that the control circuit and clock register of FIG. 4A are not identical to those of FIG. 1A, the suffix "A" is used.

In the embodiment of FIG. 4A, control circuit 28A is adapted to supply to disk drive 1 a "re-read" command which is adapted to control the disk drive to re-read the data from a particular portion thereon in the event that such data, when originally read, could not properly be interpreted. For example, and assuming that the data packs shown in FIG. 7 are recorded in sectors (for example, one or more packs may be recorded in a single sector), the re-read command may control the disk drive to re-read the last sector from which data had been reproduced. Typically, this re-read command may be supplied to disk drive 1 when an error occurs because the disk drive had been subjected to shock or vibration.

In addition, control circuit 28A is adapted to supply to clock register 26A a command which enables or inhibits the clock register to count clock signals. In response to an enable command, the clock register operates in its normal mode to count the clock signals generated by clock generator 27, thereby incrementing the timing data STC. In response to an inhibit command, the clock register "freezes" the count value stored therein and no longer counts the clock signals supplied by clock generator 27 until the enable command is next received.

As an example of the manner in which the embodiment shown in FIGS. 4A and 4B operates, let it be assumed that, during a normal play operation, a user of the apparatus initiates a pause operation. For example, a pause switch of input section 29 may be actuated. As a result, control circuit 28A supplies a pause command to disk drive 1, whereupon the reading of further video and audio data from the record medium is interrupted. Of course, at this time, video and audio information that had been read prior to the initiation of the pause operation are stored in video and audio buffers 6A and 8A. More particularly, and as illustrated in FIG. 5A, if a pause operation had not been initiated, video decoder 7 would be supplied with successive video pictures P12, B11, P14, B13, I1, B0, P3 and B2 reproduced from the record medium. This is the same sequence of picture intervals supplied to the video decoder as has been described hereinabove with respect to FIG. 3A. FIG. 5A also illustrates the video decoding time stamp data DTSV included in the video packet header for each of the indicated picture intervals; and FIG. 5A additionally represents the value of the timing data STC as clock register 26A is incremented by clock generator 27. That is, and as has been discussed above, during normal operation to decode the reproduced video data, clock register 26A is preset by the separated system clock reference data SCR and then, when incremented such that STC=DTSV, video decoder 7 is controlled by synchronization control circuit 31 to begin the decoding of the video data stored in video buffer 6A. Consequently, during a normal play operation, the video decoder supplies the successive picture intervals for display, as shown in FIG. 5B.

Let it be assumed that the pause operation is initiated at the point in time that video data of picture interval P14 is being decoded by video decoder 7, such as illustrated in FIG. 5C. Let it be further assumed that the timing data produced by clock register 26A at the time control circuit 28A produces the pause command exhibits the value STC=N+8000. The clock register responds to this pause command to interrupt its clock signal counting operation, thereby freezing the timing data therein at the value STC=N+8000. As shown in FIG. 5C, although the value of the timing data is frozen, video decoder 7 nevertheless continues to operate and completes its decoding of the video data in picture interval P14. When the video decoder attempts to decode the video data of the next picture interval B13, the video decoding time stamp data DTSV included in the packet header of picture interval B13 is compared in synchronization control circuit 31 to the timing data of clock register 26A. It is seen, however, that since the timing data has remained frozen at STC=N+8000, and since the video decoding time stamp data of picture interval B13 is DTSV=N+9009, the synchronization control circuit senses DTSV>STC. Consequently, and as has been described above, synchronization control circuit 31 controls video decoder 7 to delay the decoding of the video data stored in video buffer 6A. That is, the video decoder waits until an enable control signal is supplied thereto by the synchronization control circuit. Of course, while decoder 7 waits to decode the video data in the next picture interval from video buffer 6A, the video picture that had been previously supplied as an output video signal from the video decoder, namely picture P12, is repeatedly supplied as the output video signal, as shown in FIG. 5D.

It is appreciated that, although not shown herein, a similar wait control of audio decoder 9 is effected when the pause operation is selected. Of course, and as has been discussed above, audio muting is effected during the duration of the pause operation.

Let it now be assumed that the user terminates the pause operation at the point of time illustrated in FIG. 5C. Accordingly, control circuit 28A supplies to disk drive 1 a play command, whereupon further data packs once again are reproduced from the record medium, and the control circuit also supplies to clock register 26A an enable command, whereupon the clock register once again increments its count value in response to clock signals supplied thereto by clock generator 27. Accordingly, the clock register now increments its count from STC=N+8000. As the timing data STC produced by clock register 26A increases, synchronization control circuit 31 will sense when STC>DTSV. At that time, the synchronization control circuit supplies an enable signal to video decoder 7, whereupon the video decoder begins to decode the video data of the next picture interval stored in video buffer 6A.

In the aforedescribed pause operation, the time at which clock register 26A is inhibited and subsequently enabled is seen to be arbitrary and random with respect to the decoding by video decoder 7 of video data stored in video buffer 6A. Hence, the relationship between the video decoding time stamp and the timing data produced by clock register 26A is lost when the pause operation is canceled. Consequently, it is theoretically possible that the timing data may be incremented to the value STC=N+10000 at the point in time that video decoding time stamp extractor 30 extracts from the video information stored in video buffer 6A the video decoding time stamp data DTSV=N+9009. This theoretical possibility is illustrated in FIG. 5C. To correct this possible problem, extractor 30 and/or synchronization control circuit 31, clock register 26 and control circuit 28A may be supplied with a synchronizing signal produced by video decoder 7 (or another video processing circuit, not shown) so that the beginning and the ending of a pause operation are synchronized with the video signal or the decoding thereof. This will maintain the proper relationship between the extracted video decoding time stamp data DTSV and the timing data STC produced by clock register 26A.

A slow play operation (e.g. a slow motion display) is analogous to a pause operation. In particular, when input section 29 supplies to control circuit 28A a slow play input signal, the control circuit controls disk drive 1 and clock register 26A to carry out alternate play and pause operations. For example, a slow motion display on the order of one-half speed is effected if the pause operation is carried out for a duration of one picture interval, followed by a play operation for one picture interval, followed by a pause operation, and so on. A slow motion display of ⅓ speed is effected if the pause operation is carried out for two picture intervals followed by a play operation of one picture interval. Of course, the manner in which clock register 26A, synchronization control circuit 31 and video and audio decoders 7 and 9 are controlled during a pause operation has been discussed above.

Since a pause operation may be used to reflect what is commonly referred to by a consumer as a true "pause" mode and also is used to effect a variable slow motion play mode, it would be more accurate to describe the aforementioned operation as if control circuit 28A generates an interrupt command to temporarily interrupt the reproduction of new multiplexed data from the record medium by disk drive 1.

Let it be assumed that disk drive 1 is subjected to an impact, such as shock or vibration, making it impossible for ECC circuit 3 to correct the resultant errors which are present in the reproduced data. In that event, the ECC circuit supplies to control circuit 28A ECC STATUS data which indicates that an uncorrectable error has occurred and further identifies the location of the record medium (e.g. the sector number) from which the data containing that uncorrectable error has been reproduced. In response to this ECC status data, control circuit 28A supplies a re-read command to disk drive 1 and also supplies to clock register 26A the aforementioned interrupt command. As a result, the operation of the clock register, synchronization control circuit 31, video decoder 7 and audio decoder 9 is substantially the same as has been described hereinabove with respect to a pause operation. While video decoder 7 is inhibited from decoding video data from the next picture interval in video buffer 6A, and continues to supply as an output for display the previously decoded picture interval, disk drive 1 re-reads the video data from the same location (or sector) from which the uncorrectable data had been reproduced. Of course, when such data is re-read and contains no errors or, if errors are present, such errors are corrected, a suitable ECC STATUS indication is supplied to control circuit 28A, whereupon the interrupt command that had previously been produced by the control circuit is terminated. As a result, the re-read multiplexed data is decoded and displayed. Of course, and as has been described above, during the interval that the disk drive is controlled to re-read the record medium, a still video image and muted sound are displayed such that, during this interval, a user is not provided with an annoying or disagreeable display.

Thus, it is seen that, when a re-read operation is carried out because uncorrectable errors are present, the decoders are inhibited from decoding the video and audio data stored in video and audio buffers 6A and 8A until the re-read data is successfully reproduced from the record medium and supplied to the video and audio buffers. Likewise, clock register 26A is inhibited from counting the clock signals supplied by clock generator 27 until the data re-read from the record medium is reproduced successfully and supplied to the video and audio buffers.

While the present invention has been particularly shown and described with reference to preferred embodiments, it will be readily appreciated that various modifications may be made without departing from the spirit and scope of the invention. It is intended that the appended claims be interpreted to cover the embodiments specifically disclosed herein, those changes and modifications which have been discussed above and all equivalents thereto.

What is claimed is:

1. Apparatus for reproducing video data from a record medium on which is recorded in multiplexed form the video data, reference time data representing a reference time and video time data representing the time at which decoding of said video data reproduced from the record medium should begin, said apparatus comprising:

reference time data separating means for separating said reference time data from the reproduced multiplexed data and for generating timing data based thereon;

a video buffer for temporarily storing the video data and video time data which are reproduced from said record medium;

a video time data extractor coupled to said video buffer for extracting the video time data from said video buffer;

a video decoder for decoding the video data temporarily stored in said video buffer, said video buffer being connected to said video time data extractor and to said video decoder; and synchronizing control means coupled to receive and compare said generated timing data and said extracted video time data and for controlling said video decoder as a function of the comparison.

2. The apparatus of claim 1 wherein said reference time data separating means includes a clock generator for generating clock signals, and means for incrementing a reference time established by said reference time data with said clock signals to generate said timing data.

3. The apparatus of claim 2 wherein said synchronizing control means is operative to sense when said timing data is substantially equal to said extracted video time data to initiate the decoding of said video data by said video decoder.

4. The apparatus of claim 3 wherein said synchronizing control means is further operative to sense when said timing data and said extracted video time data differ from each other by at least a predetermined amount, thereby indicating a synchronizing error.

5. The apparatus of claim 4 wherein said video data is recorded on said record medium as a series of video pictures, each video picture exhibiting a picture interval; and wherein said synchronizing control means is additionally operative to delay by the picture interval the decoding of the video data by said video decoder when said extracted video time data exceeds said timing data by at least said predetermined amount.

6. The apparatus of claim 5 wherein said synchronizing control means is still further operative to cause said video decoder to skip to a next picture interval for decoding said next picture interval when said timing data exceeds said extracted video time data by at least said predetermined amount.

7. The apparatus of claim 1 wherein the multiplexed data recorded on said record medium further includes audio data and audio time data representing the time at which decoding of said audio data reproduced from the record medium should begin, and wherein said apparatus further comprises an audio buffer for temporarily storing the audio data and audio time data which are reproduced from said record medium, an audio time data extractor for extracting the audio time data from said audio buffer and an audio decoder for decoding the reproduced audio data temporarily stored in said audio buffer, said audio buffer being connected to said audio time data extractor and to said audio decoder; and wherein said synchronizing control means is further coupled to receive said extracted audio time data and to compare said extracted audio time data to said generated timing data for controlling said audio decoder as a function of the comparison.

8. The apparatus of claim 7 wherein said synchronizing control means is additionally operative to compare the extracted video time data to the extracted audio time data for controlling a selected one of the video decoder or the audio decoder in response to the comparison.

9. The apparatus of claim 3 wherein said video data is recorded on said record medium as a series of video pictures exhibiting respective picture intervals; and further comprising means for generating an interrupt command to temporarily interrupt the reproduction of new multiplexed data from said record medium; and wherein said video decoder is responsive to said interrupt command to delay until the interrupt command terminates the decoding of a next picture interval of video data.

10. The apparatus of claim 9 wherein said means for incrementing a reference time is inhibited for the duration of said interrupt command, and wherein said synchronizing control means is further operative to sense when the extracted video time data is greater than said timing data to cause said video decoder not to decode the video data of said next picture interval.

11. The apparatus of claim 10 wherein said means for incrementing is enabled when the interrupt command terminates; and wherein said synchronizing control means is additionally operative to sense when said timing data is greater than said extracted video time data to cause said video decoder to decode said next picture interval of video data.

12. The apparatus of claim 7 further comprising means for generating an interrupt command to temporarily interrupt the reproduction of new multiplexed data from said record medium; and wherein the video and audio decoders are responsive to said interrupt command to delay until said interrupt command terminates the decoding of video and audio data stored in said video and audio buffers.

13. The apparatus of claim 3 further comprising means for generating a re-read command to cause said reproducing means to re-reproduce the multiplexed data from a portion of said record medium and to cause said video decoder to delay the decoding of video data temporarily stored in said video buffer until re-reproduced video data is supplied thereto.

14. The apparatus of claim 13 wherein said means for incrementing a reference time is inhibited until said re-reproduced video data is supplied to said video buffer; and wherein said synchronizing control means is further operative to sense when the extracted video time data is greater than said timing data to cause said video decoder not to decode the video data in said video buffer.

15. The apparatus of claim 14 wherein said means for incrementing is enabled when re-reproduced multiplexed data is supplied to said video buffer; and wherein said synchronizing control means is additionally operative to sense when said timing data is greater than said extracted video time data to cause said video decoder to decode the video data stored in said video buffer.

16. The apparatus of claim 7 further comprising means for generating a re-read command to cause said reproducing means to re-reproduce the multiplexed data from a portion of said record medium and to cause said video and audio decoders to delay the decoding of video and audio data temporarily stored in said video and audio buffers, respectively, until re-reproduced video and audio data are supplied thereto.

17. The apparatus of claim 16 wherein said reference time data separating means includes a clock generator for generating clock signals and increment means for incrementing a reference time established by said reference time data with said clock signals to generate said timing data, said increment means being inhibited until said re-reproduced video and audio data are supplied to said video and audio buffers; and wherein said synchronizing control means is further operative to sense when at least one of the extracted video and audio time data is greater than said timing data to cause said video and audio decoders not to decode the video and audio data in the video and audio buffers, respectively.

* * * * *